US006876943B2

(12) United States Patent
Wegerich

(10) Patent No.: US 6,876,943 B2
(45) Date of Patent: Apr. 5, 2005

(54) INFERENTIAL SIGNAL GENERATOR FOR INSTRUMENTED EQUIPMENT AND PROCESSES

(75) Inventor: Stephan W. Wegerich, Glendale Heights, IL (US)

(73) Assignee: SmartSignal Corporation, Lisle, CA (US)

( * ) Notice: Subject to any disclaimer, the term of this patent is extended or adjusted under 35 U.S.C. 154(b) by 0 days.

(21) Appl. No.: 10/393,338

(22) Filed: Mar. 20, 2003

(65) Prior Publication Data

US 2003/0158694 A1 Aug. 21, 2003

Related U.S. Application Data

(63) Continuation of application No. 09/718,592, filed on Nov. 22, 2000, now Pat. No. 6,556,939.

(51) Int. Cl.[7] .............................................. G01D 1/00
(52) U.S. Cl. ...................................... 702/127; 702/182
(58) Field of Search ................................ 700/9, 11, 12, 700/50, 67, 73, 95, 51, 52; 702/179, 181, 182, 183, 188, 127

(56) References Cited

U.S. PATENT DOCUMENTS

| | | | |
|---|---|---|---|
| 4,060,716 A | 11/1977 | Pekrul et al. | |
| 4,639,882 A | 1/1987 | Keats | |
| 4,707,796 A | 11/1987 | Calabro et al. | |
| 4,761,748 A | 8/1988 | Le Rat et al. | |
| 4,796,205 A | 1/1989 | Ishii et al. | |
| 4,823,290 A | 4/1989 | Fasack et al. | |

(Continued)

FOREIGN PATENT DOCUMENTS

WO   WO 00/67412   11/2000

OTHER PUBLICATIONS

Sowizral, H; "Virtual Sensors"; Proceedings SPIE International Society for Optical Engineering; vol. 2409; Feb. 7–9, 1995; pp 246–254.*
Spoelder, H; "Virtual Instrumentation and Virtual Environments" IEEE Instrumentation and Measurement Magazine; vol. 2, Issue 3; Sep. 1999; pp 14–19.*
Goodwin, G; "Evaluating the Performance of Virtual Sensors"; Proceedings Information, Decision and Control 1999; Feb. 8–10, 1999; pp 5–12.*
Various; "IEEE Instrumentation and Measurement Technology Conference Sensing, Processing, Networking"; Instrumentation and Measurement Technology Conference; vol. 2; May 19–21, 1997; pp i–xxiii.*

(Continued)

Primary Examiner—Michael Nghiem
Assistant Examiner—Douglas N Washburn
(74) Attorney, Agent, or Firm—Fitch, Even, Tabin & Flannery

(57) ABSTRACT

An improved system and method for producing replacement sensor signals for failed sensors, and inferred sensor signals for non-instrumented physical parameters, in processes and equipment having one or more sensors in place for monitoring physical parameters. A data history from a fully-instrumented prototype provides a representative data set of anticipated operating parameters for forming an empirical model in a computer module for generating "virtual" signals for a process or machine in real-time. Replacement or inferential sensor signals can be advantageously used in downstream control processing or analysis. A memory for storing the representative training set, or a transformation thereof, is coupled to a processor. The processor receives from an input data signals embodying real values from sensors actually on the process or machine, and may receive these in real-time. The processor is disposed to take a set of readings of the actual sensors from the input, mid generate an estimate of one or more desired inferred sensors, using a linear combination of the representative training set sensor data, as weighted by the result of a measure of similarity of the input sensor data to the representative training set sensor data.

7 Claims, 10 Drawing Sheets

U.S. PATENT DOCUMENTS

| | | |
|---|---|---|
| 4,841,456 A | 6/1989 | Hogan, Jr. et al. |
| 4,937,763 A | 6/1990 | Mott |
| 4,985,857 A | 1/1991 | Bajpai et al. |
| 5,003,950 A | 4/1991 | Kato et al. |
| 5,025,499 A | 6/1991 | Inoue et al. |
| 5,093,792 A | 3/1992 | Taki et al. |
| 5,119,287 A | 6/1992 | Nakamura et al. |
| 5,119,468 A | 6/1992 | Owens |
| 5,213,080 A | 5/1993 | Lambert et al. |
| 5,223,207 A | 6/1993 | Gross et al. |
| 5,251,285 A | 10/1993 | Inoue et al. |
| 5,285,494 A | 2/1994 | Sprecher et al. |
| 5,309,351 A | 5/1994 | McCain et al. |
| 5,386,373 A | 1/1995 | Keeler et al. |
| 5,414,632 A | 5/1995 | Mochizuki et al. |
| 5,445,347 A | 8/1995 | Ng |
| 5,459,675 A | 10/1995 | Gross et al. |
| 5,481,647 A | 1/1996 | Brody et al. |
| 5,486,997 A | 1/1996 | Reismiller et al. |
| 5,495,168 A | 2/1996 | de Vries |
| 5,500,940 A | 3/1996 | Skeie |
| 5,539,638 A | 7/1996 | Keeler et al. |
| 5,548,528 A | 8/1996 | Keeler et al. |
| 5,553,239 A | 9/1996 | Heath et al. |
| 5,566,092 A | 10/1996 | Wang et al. |
| 5,596,507 A | 1/1997 | Jones et al. |
| 5,600,726 A | 2/1997 | Morgan et al. |
| 5,602,733 A | 2/1997 | Rogers et al. |
| 5,608,845 A | 3/1997 | Ohtsuka et al. |
| 5,623,109 A | 4/1997 | Uchida et al. |
| 5,629,878 A | 5/1997 | Kobrosly |
| 5,638,413 A | 6/1997 | Uematsu et al. |
| 5,668,944 A | 9/1997 | Berry |
| 5,680,409 A | 10/1997 | Qin et al. |
| 5,680,541 A | 10/1997 | Kurosu et al. |
| 5,682,317 A | 10/1997 | Keeler et al. |
| 5,699,403 A | 12/1997 | Ronnen |
| 5,708,780 A | 1/1998 | Levergood et al. |
| 5,710,723 A | 1/1998 | Hoth et al. |
| 5,714,683 A | 2/1998 | Maloney |
| 5,727,144 A | 3/1998 | Brady et al. |
| 5,748,496 A | 5/1998 | Takahashi et al. |
| 5,753,805 A | 5/1998 | Maloney |
| 5,754,451 A | 5/1998 | Williams |
| 5,757,309 A | 5/1998 | Brooks et al. |
| 5,761,090 A | 6/1998 | Gross et al. |
| 5,764,509 A | 6/1998 | Gross et al. |
| 5,784,285 A | 7/1998 | Tamaki et al. |
| 5,787,138 A | 7/1998 | Ocieczek et al. |
| 5,790,977 A | 8/1998 | Ezekiel |
| 5,796,633 A | 8/1998 | Burgess et al. |
| 5,817,958 A | 10/1998 | Uchida et al. |
| 5,842,157 A | 11/1998 | Wehhofer et al. |
| 5,845,230 A | 12/1998 | Lamberson |
| 5,845,627 A | 12/1998 | Olin et al. |
| 5,864,773 A | 1/1999 | Barna et al. |
| 5,886,913 A | 3/1999 | Marguinaud et al. |
| 5,905,989 A | 5/1999 | Biggs |
| 5,933,352 A | 8/1999 | Salut |
| 5,933,818 A | 8/1999 | Kasravi et al. |
| 5,956,487 A | 9/1999 | Venkatraman et al. |
| 5,961,560 A | 10/1999 | Kemner |
| 5,963,884 A | 10/1999 | Billington et al. |
| 5,970,430 A | 10/1999 | Burns et al. |
| 5,995,916 A | 11/1999 | Nixon et al. |
| 6,006,260 A | 12/1999 | Barrick, Jr. et al. |
| 6,023,507 A | 2/2000 | Wookey |
| 6,026,348 A | 2/2000 | Hala |
| 6,049,741 A | 4/2000 | Kawamura |
| 6,049,827 A | 4/2000 | Sugauchi et al. |
| 6,076,088 A | 6/2000 | Paik et al. |
| 6,110,214 A | 8/2000 | Klimasauskas |
| 6,115,653 A | 9/2000 | Bergstrom et al. |
| 6,236,908 B1 | 5/2001 | Cheng et al. |
| 6,356,857 B1 | 3/2002 | Qin et al. |
| 6,502,082 B1 * | 12/2002 | Toyama et al. ............... 706/16 |
| 6,519,552 B1 * | 2/2003 | Sampath et al. ............ 702/183 |
| 6,556,939 B1 * | 4/2003 | Wegerich .................... 702/127 |
| 6,751,575 B2 * | 6/2004 | Lenz et al. ................. 702/182 |
| 2002/0087290 A1 * | 7/2002 | Wegerich et al. ........... 702/182 |
| 2002/0183971 A1 * | 12/2002 | Wegerich et al. ........... 702/185 |

OTHER PUBLICATIONS

Long, T; Hanzevack, E; Bynum, W; "Sensor Fusion and Failure Detection Using Virtual Sensors"; Proceedings of the 1999 American Control Conference; vol. 4; Jun. 1999; pp 2417–2421.*

"Pneumatic and Thermal State Estimators for Production Engine Control and Diagnostics" by Peter J. Maloney and Peter M. Olin, SAE Technical Paper Series 980517, International Congress and Exposition, Feb. 23–26, 1998, Copyright 1998 Society of Automotive Engineers, Inc. (ISSN 0148-7191).

"Application of a New Technique for Modeling System Behavior" by Paul J. O'Sullivan, presented at the ISA Symposium, Edmonton, Alberta, May 1, 1991, © Copyright 1991 Instrument Society of America (21 pp.).

"A Universal, Fault–Tolerant, Non–Linear Analytic Network for Modeling and Fault Detection," by J.E. Mott, R.W. King, L.R. Monson, D.L. Olson, and J.D. Staffon, Proceedings of the $8^{th}$ Power Plant Dynamics, Control & Testing Symposium, Knoxville, Tennessee, May 27–29, 1992 (14pp.).

ModelWare™ Product Review by Robert D. Flori, reprinted from Computerized Investing, Sep./Oct. 1992, vol. XI, No. 5, copyright by the American Association of Individual Investors (pp. 8–10).

Modelware™ A New Approach to Prediction by Ken Tucker, reprinted from PC A1 magazine, Jan./Feb. 1993, pp. 14, 15, 30.

"Similarity Based Regression: Applied Advanced Pattern Recognition for Power Plant Analysis," by E.J. Hansen and M.B. Caudill, presented at the 1994 EPRI Heat Rate Improvement Conference (9 pp.).

"Applied Pattern Recognition for Plant Monitoring and Data Validation," by Ron Griebenow, E.J. Hansen, and A.L. Sudduth, presented at the Fifth International Joint ISA POWID/EPRI Controls and Instrumentation Conference, La Jolla, California, Jun. 19–21, 1995 (11 pp.).

"Model–Based Nuclear Power Plant Monitoring and Fault Detection: Theoretical Foundations," by Ralph M. Singer, Kenny C. Gross, James P. Herzog, Ronald W. King, and Stephan Wegerich, presented at the International Conference on Intelligent System Application to Power Systems (ISAP '97), Jul. 6–10, 1997, Seoul, Korea (pp. 60–65).

"MSET Modeling of Crystal River–3 Venturi Flow Meters" by J.P. Herzog, S.W. Wegerich, K.C. Gross and F.K. Bockhorst, $6^{th}$ International Conference on Nuclear Engineering, ICONE–6169, May 10–14, 1998, Copyright © 1998 ASME (12 pp).

"Application of a Model–Based Fault Detection System to Nuclear Plant Signals," by K.C. Gross, R.M. Singer, S.W. Wegerich, J.P. Herzog, R. VanAlstine, and F. Bockhorst, presented at the International Conference on Intelligent System Application to Power Systems (ISAP '97), Jul. 6–10, 1997, Seoul, Korea (pp. 66–70).

* cited by examiner

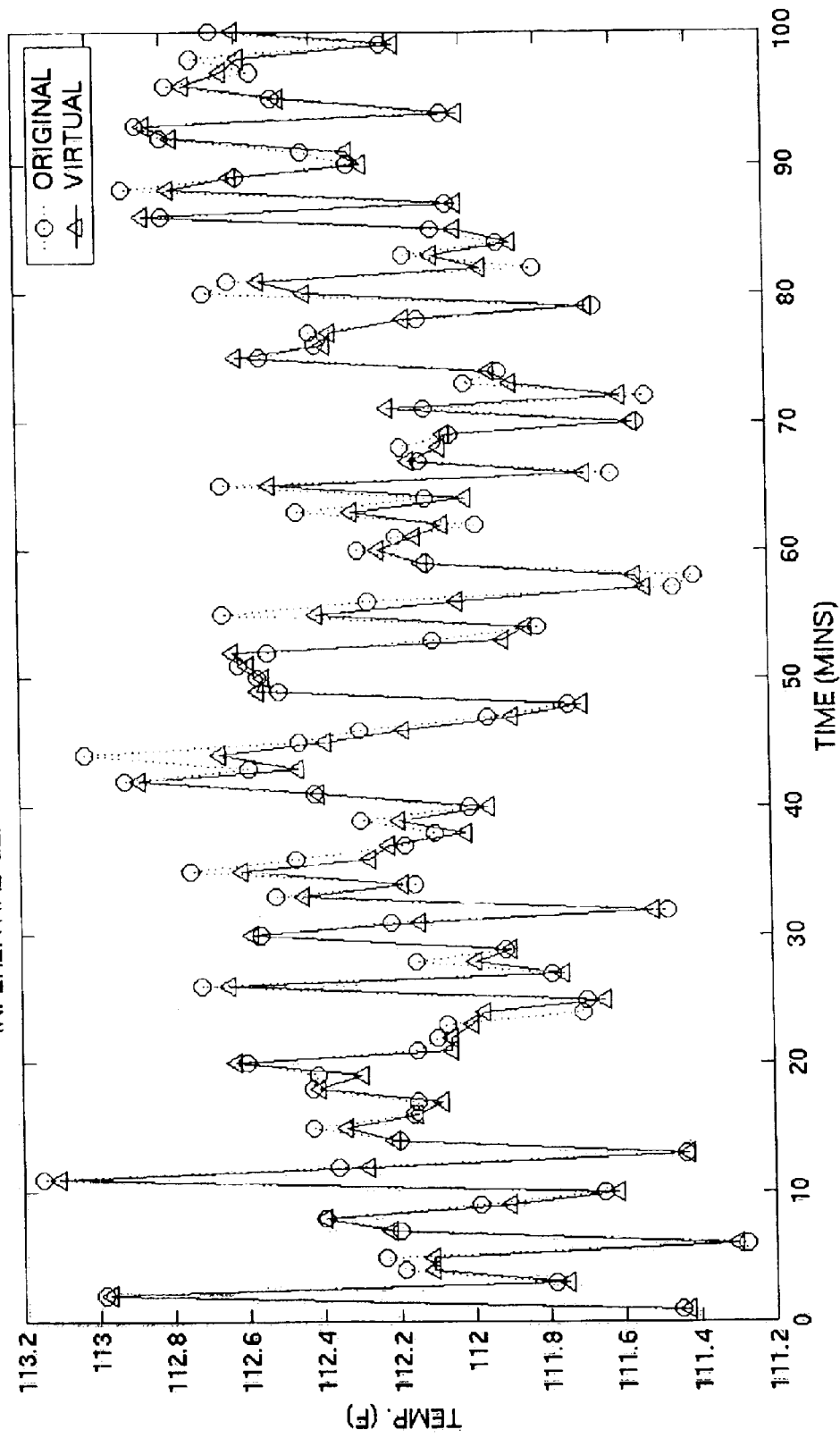

INFERENTIAL SIGNAL GENERATOR FOR INSTRUMENTED EQUIPMENT AND PROCESSES

This is a continuation of prior application Ser. No. 09/718,592 filed 22 Nov. 2000, now U.S. Pat. No. 6,556,939.

FIELD OF THE INVENTION

The present invention relates to the monitoring of physical processes for early detection of impending equipment failure or process disturbance and on-line, continuous validation of sensor operation. More particularly, the invention relates to systems and methods for the generation of replacement signals for failed sensors or for inferred signals for physical parameters that are not directly instrumented.

BACKGROUND OF THE INVENTION

Monitoring the performance of almost any process (such as in refining, chemicals, steel, energy production) requires the use of sensors to assure that operation is maintained within prescribed constraints and that equipment is performing within specifications to assure acceptable product quality and yield. Performance monitoring and optimization of equipment and machines (automobile systems, jet engines, discrete manufacturing, etc.) similarly relies on sensors to ensure safe operation and peak performance. A plethora of sensors have been developed to measure electrical, thermal, chemical and physical parameters of processes and equipment. Types of sensors include thermocouples, accelerometers, mass flow meters, acoustic sensors, stress and strain indicators, vibration sensors, and so on.

For most important process and equipment monitoring and control applications, sensors are nowadays electrically powered, and provide an electrical indication (either analog or digital) of the parameter that is sought to be measured. Furthermore, in many circumstances, sensors are connected via a bus or network, and may contain sufficient processing power on-board to packetize sensor data and transmit it across a network. In some cases, sensors are connected with or contain wireless transmitters or transceivers for transmission of sensor data to a remote location.

Sensor data can be used in processes or in equipment operation in a variety of ways. Sensors provide validation that control settings have taken effect, and a typical practice is to indicate an alarm when a sensor reading exceeds or drops below a safety or tolerance threshold. Sensor data can also be streamed to a data repository for off-line analysis and trending which is used to schedule maintenance or refine a process. A further use of sensor data is to provide feedback for continuous control of the operation of a process of piece of equipment. In an automobile engine, for example, a number of subsystems use sensor data to compute downstream settings for optimal engine performance, or to meet certain minimum clean air requirements.

There are a variety of circumstances in which it is difficult or impossible to employ a sensor to measure a desired parameter. The environment in which the sensor is placed may be hostile to the longevity or even proper functioning of a sensor, as for example in measuring the flow of a gas containing a problematically high concentration of corrosive acid. Alternatively, the environment may require a sensor that is prohibitively expensive or hard to come by. In another alternative circumstance, the measurement sought may be impossible to reasonably measure directly, as in attempting to determine the remaining empty volume of an unusually shaped chamber partially filled with a liquid. In yet other circumstances, the deployment of a sensor may adversely weaken or otherwise impact the process or system being monitored. For example, in a closed fluid system such as a hydraulic system, placement of a sensor through the wall of the system to directly measure a property of the fluid presents a point of weakness and potential failure in the closed system. What is needed is a way of indirectly measuring the parameter in question.

Under such circumstances, one may attempt to measure one or more other parameters in order to infer the desired parameter. This may require outfitting the process or equipment with additional sensors, and using computing resources to compute the inferred parameter. However, it is generally difficult to successfully do this. Furthermore, it usually requires a great deal of study and knowledge of the process or equipment, or an understanding of the "first-principles" dynamics of the system, which may not be readily obtained without an unreasonable amount of research time and cost. What is needed is an effective way of inferring a hard-to-measure parameter from other measured parameters of a system that correlate in some way, without requiring a complete knowledge of the dynamics of the system and the parameters involved.

Such a need also exists for the circumstance of manufacturing an instrumented product, such as an engine or other machine, which uses sensors for feedback control, safety, or performance optimization. It is highly desirable to reduce the cost of producing the product by not outfitting the product with a sensor for every parameter, but instead inferring some parameters based on readings from other sensors. Such an inference may be possible using a subset of sensors for the machine or engine, coupled with extensive knowledge of the behavior of all the parameters in tandem. However, the requisite knowledge can be difficult and costly to develop. Furthermore, the cost of additional computing power that may be required on-board the product to calculate the inferred sensor values may outweigh the cost savings of removing sensors in the first place. What is needed is a computationally efficient way of inferring values for sensors "removed" from the production units from values of sensors that are in fact built into the production units of the product.

An additional difficulty is presented with the failure of sensors. As an example, sensors may be used to monitor a process or equipment to detect when it deviates from "normal" or correct operation. Normal can mean an acceptable functioning state, or it can be the most preferred of a set of various acceptable states. However, in practice the deviation can be due to a change in the underlying parameter measured by the sensor, or to a faulty sensor. Hence, it is essential that the health of these sensors is also known, and disturbances initiated by sensor faults should be identified and differentiated from process deviations. Often, even though a sensor has failed, it is desirable to continue process operation and the failed sensor must be replaced with a replacement or "virtual" sensor providing the same information. What is needed is a way of providing an output or estimate for a failed sensor within a system to enable continued operation.

"First principles" techniques are known in the art for generating "virtual" sensor data based on other real sensor data. Maloney et al. describe in "Pneumatic And Thermal State Estimators For Production Engine Control And Diagnostics", Electronic Engine Controls 1998, estimator algorithms implemented in a production grade speed-density Engine Management Systems (EMS). A critical and basic need in the design of EMS control and diagnostic algorithms is the availability of information describing the state of the engine. The estimator algorithms provide engine mass flow, pressure, and temperature estimates for general use by control, diagnostic, and other estimator algorithms. Maloney et al. describe the development of such first principles models with fully instrumented engines in the laboratory, to compute virtual signals off of real sensor signals. The development is involved and highly specific to the application presented. It would thus be desirable to provide a general method for the generation of missing values or virtual signals without have to resort to developing first principles models.

In a related trend, processes or machines are monitored by software-based systems that monitor correlated sensor values in aggregate. Such a system is described in U.S. Pat. No. 5,764,509 to Gross et al., the teachings of which are hereby incorporated by reference. Such a system for monitoring or providing control over a process or machine is superior to traditional threshold-type sensor-based monitoring and control because it can generally differentiate the normal or acceptable behavior of the process or machine from unacceptable or alarm states long before the threshold system. Gross et al. teach an empirical modeling technique that accepts as inputs a set of current sensor readings for linearly and non-linearly correlated parameters of the monitored process or machine, and generates estimates as outputs of what those current sensor readings ought to be. This is then compared using a statistical hypothesis test for each sensor to determine whether any sensor is showing a statistically significant deviation from what is expected. The empirical model of Gross et al. is created from a history of collected data representing the expected ranges of operation for the monitored process or machine.

An important issue for such a system is the robustness of the system when presented with a failure of a sensor, as opposed to a process or functional deviation. A bad sensor signal input to such a system potentially can impact the estimates made by the model for all the sensors in the process or machine. Furthermore, other control modules outside the monitoring system may be relying on the bad sensor signal. It would be beneficial in such systems to reduce the impact of a failed sensor on the ability of the system to generate accurate estimates and therefore accurately portray the operational state of the process or machine. It would be additionally advantageous to be able to generate a replacement signal for the failed sensor and make it available to any other control systems that normally rely on raw real-time sensor signals. There is a need for a way to handle a bad sensor under these circumstances in an empirical modeling system like that by Gross et al.

SUMMARY OF THE INVENTION

The present invention provides an improved system and method for producing replacement sensor signals for failed sensors, and inferred sensor signals for non-instrumented physical parameters, in processes and equipment having one or more sensors in place for monitoring physical parameters. The system can provide expected parameter values, as well as the differences between expected and input signals; or the system can provide raw measures of similarity between the collection of input signals and the collection of acceptable modeled states.

In a process or machine that is fully instrumented with sensors for all parameters of interest, sensor data is collected for all regimes of expected later operation of the same or similar processes or machines. This collected data forms a history from which the inventive system can "learn" the desired or normal operation of the process or machine, using training routines that distill it to a representative set of sensor data. Using this representative training set of sensor data, the described embodiments monitor the process or machine in real-time operation (or in batch mode, if preferred), and generate estimates for certain of the sensors for which historic data was collected, but which have failed or which were removed from the process or machine. The invention can be employed as a safeguard that is triggered to produce a replacement sensor signal when an actual sensor fails (an autoassociative or replacement mode). It can also be used to produce an inferred sensor signal to reduce the production cost of a machine by reducing the number of sensors that are needed to monitor and control the machine (an inferential mode).

The apparatus of the present invention can be deployed as an electrically powered device with memory and a processor, physically located on or near the process or machine for which the "virtual" signal is generated. Alternatively, it can be located remotely from the process or machine, as a module in a computer receiving sensor data from live sensors on the process or machine via a network or wireless transmission facility. The replacement or inferred sensor signals generated accordingly may be returned to a control system or display system local to the process or machine, or located at the remote location or yet a different remote location.

A memory for storing the representative training set, or a transformation thereof, is coupled to a processor. The processor receives from an input data signals embodying real values from sensors actually on the process or machine, and may receive these in real-time. The processor is disposed to take a set of readings of the actual sensors from the input, and generate an estimate of one or more desired inferred sensors, using a linear combination of the representative training set sensor data, as weighted by the result of a measure of similarity of the input sensor data to the representative training set sensor data.

Accordingly, it would be advantageous to provide a method of generating an estimate of a physical parameter of a process or machine based on sensor values for other physical parameters of the process or machine, and based on a set of sensor data for the process or machine representative of past operation. The improved monitoring system may accept an input set of sensor data for a process or machine, and provide as output at least one estimate of a parameter of the process or machine that is not among the sensor inputs. A computationally efficient method and apparatus for generating a replacement signal for a parameter in a sensor-monitored process or machine is also desirable when it is determined that a sensor has failed. To this end, it would be advantageous to provide a computer-executable module for generating a replacement sensor signal for a failed sensor, or an inferred sensor signal for a non-instrumented parameter, based on an input of other parameters or a process or machine, and for outputting the estimate to a display or control system. A microprocessor-based component may be added to a machine to interface with sensor data in the machine to provide inferred estimates of at least one additional physical parameter of the machine not measured by sensors.

BRIEF DESCRIPTION OF THE DRAWINGS

The novel features believed characteristic of the invention are set forth in the appended claims. The invention itself, however, as well as the preferred mode of use, further objectives and advantages thereof, is best understood by reference to the following detailed description of the embodiments in conjunction with the accompanying drawings, wherein:

FIG. 11 shows a chart of a virtual signal generated as compared to the corresponding actual sensor signal in accordance with the invention.

DETAILED DESCRIPTION OF THE PREFERRED EMBODIMENTS

Figure 1:
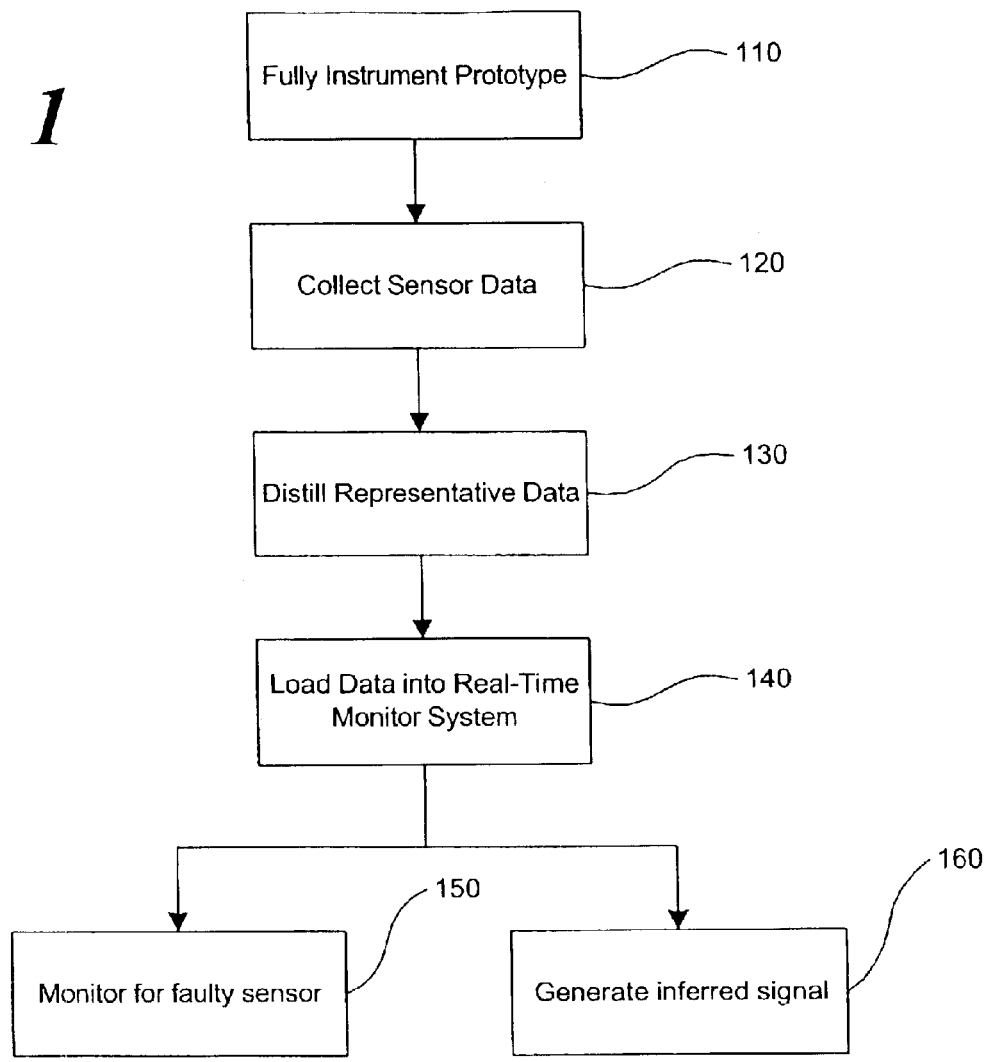
FIG. 1 illustrates steps for setting up inventive virtual signal generation for a process or machine.

Turning to FIG. 1, a flowchart generally shows the steps for setting up and using a process, machine, system or other piece of equipment, whether mechanical, electrical or biological in accordance with the invention. In step 110, a described embodiment of the process or machine from which inferred or replacement signals may be generated in operation, is fully instrumented with sufficient sensors to measure all parameters of interest, including the parameters for which virtual signals will be generated. In step 120, sensor data is collected as the prototype is operated through all ranges of operation that are expected later. In step 130, one of several "training" methods is used to distill the sensor data collected in step 120 into a subset sufficient to representative the operational ranges and correlations between the sensors over those ranges. These methods will be discussed below. In step 140, the distilled representative sensor data or a transformation of that data, including data elements corresponding to each of the (all) sensors with which the prototype was instrumented, is loaded into a processor memory that will provide for generation of virtual sensor signals for the process or machine in normal operation. In step 150, the application for generating virtual sensor signals is as replacement sensor signals for sensors that fail in operation. In step 160, the application for generating virtual sensor signals is as inferred signals for sensors that are removed or not built into production runs of like machines or equipment, thus saving the cost of the absent sensors while nonetheless providing signals for downstream processing.

The described embodiments substantially provide the process or machine for which virtual signals will be generated in operation. For example, in the case of an engine, a prototype engine can be fully instrumented in a laboratory bench setting with sensors for all parameters. The prototype engine is then operated through a variety of operational ranges, and sensor data for all the sensors is recorded, usually as digitized and time-stamped values by means of digital computers attached to and in communication with the sensor outputs. Using the computer processor and software of the described embodiments, the collected sensor data is then distilled down to a subset of sensor data that represents the operational ranges for which data was collected. Where the goal is to mass produce this engine with a reduced cost of production by building in fewer sensors, but still have all the sensor signals available for engine monitoring and control, the distilled representative data is provided in an inventive computer software module and processor hardware for executing it, that can be built into the engine monitoring or control system, and that generates virtual signals for the missing sensors as detailed below. The system described in the preferred embodiments provides for monitoring of the instrumented equipment with a plurality of sensors capable of being monitored with an information processor. A data acquisition input front end is provided for use with the information processor for receiving operational values descriptive of physical parameters of the system. Time-correlated sensor data representative of expected operational states and signals observed from the instrumented equipment during operation are used by the information processor for generating outputs that are descriptive of a parameter that may include or be provided in addition to signals observed from the instrumented equipment. The information processor is operable in response to the plurality of sensors of the instrumented equipment for establishing relationships between the component signals and one or more process parameters of the equipment to generate one or more parametric signals corresponding to process parameters of the system.

As another example, for a process in which it is desirable to measure a parameter that would require placing a sensor in a corrosive or destructive environment, a mock-up of the process can be constructed in a laboratory setting, fully instrumented. The mock-up can be operated through the expected ranges of later operation, and data collected over these ranges. While one or more sensors may eventually be destroyed this way until enough data is collected, the subsequent inventive inferential model will enable full-scale operation of the process in question without any subsequent need to replace further destroyed sensors. The parameter can be generated in operation by the computer module of the described embodiments, referencing the representative data distilled from data collected in the laboratory.

The amount of historic data that must be collected to provide for the representative training set is of course contingent on the specific application and the variety of operational modes and ranges that will be encountered in normal monitored operation, but in any case usually represents much less time and effort than is required to study the system through all its ranges to derive a first-principles model of the system. Importantly, the data collected should include both sides of any hysteresis present in the operational modes.

The described embodiments thus provide an extremely beneficial empirical approach to providing replacement sensor signals or inferred sensor signals for process or machine monitoring or control. It avoids the lengthy or perhaps insurmountable task of developing a first-principles model and understanding of the relationships between all the instrumented parameters.

Figure 2:
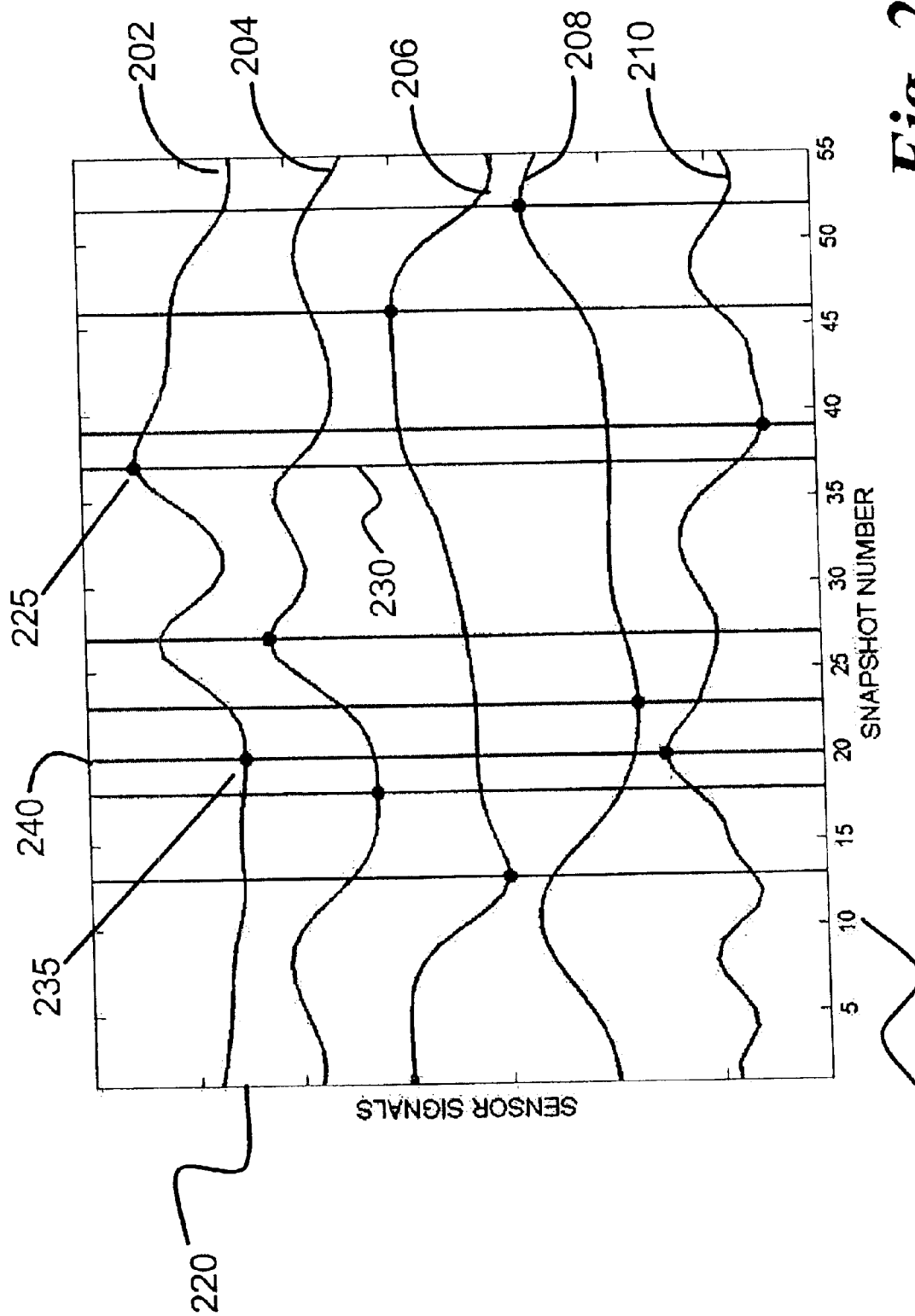
FIG. 2 illustrates a method for creating a representative "training" data set from collected sensor data for use in the invention.

Turning to FIG. 2, a method for step 130 is graphically depicted for distilling the collected sensor data from step 120 to create a representative training data set. Five sensor signals 202, 204, 206, 208 and 210 are shown for a process or machine in which later one or more of the five will be inferentially generated. The abscissa axis 215 is the sample number or time stamp of the collected sensor data, where the data is digitally sampled and the sensor data is temporally correlated. The ordinate axis 220 represents the relative magnitude of each sensor reading over the samples or "snapshots". Each snapshot represents a vector of five elements, one reading for each sensor in that snapshot. Of all the sensor data collected in step 120 (all the snapshots), according to this training method, only those five-element snapshots are included in the representative training set that contain either a global minimum or a global maximum value for any given sensor. Therefore, for sensor 202, the global maximum 225 justifies the inclusion of the five sensor values at the intersections of line 230 with each sensor signal, including global maximum 225, in the representative training set, as a vector of five elements. Similarly, for sensor 202, the global minimum 235 justifies the inclusion of the five sensor values at the intersections of line 240 with each sensor signal.

Figure 3:
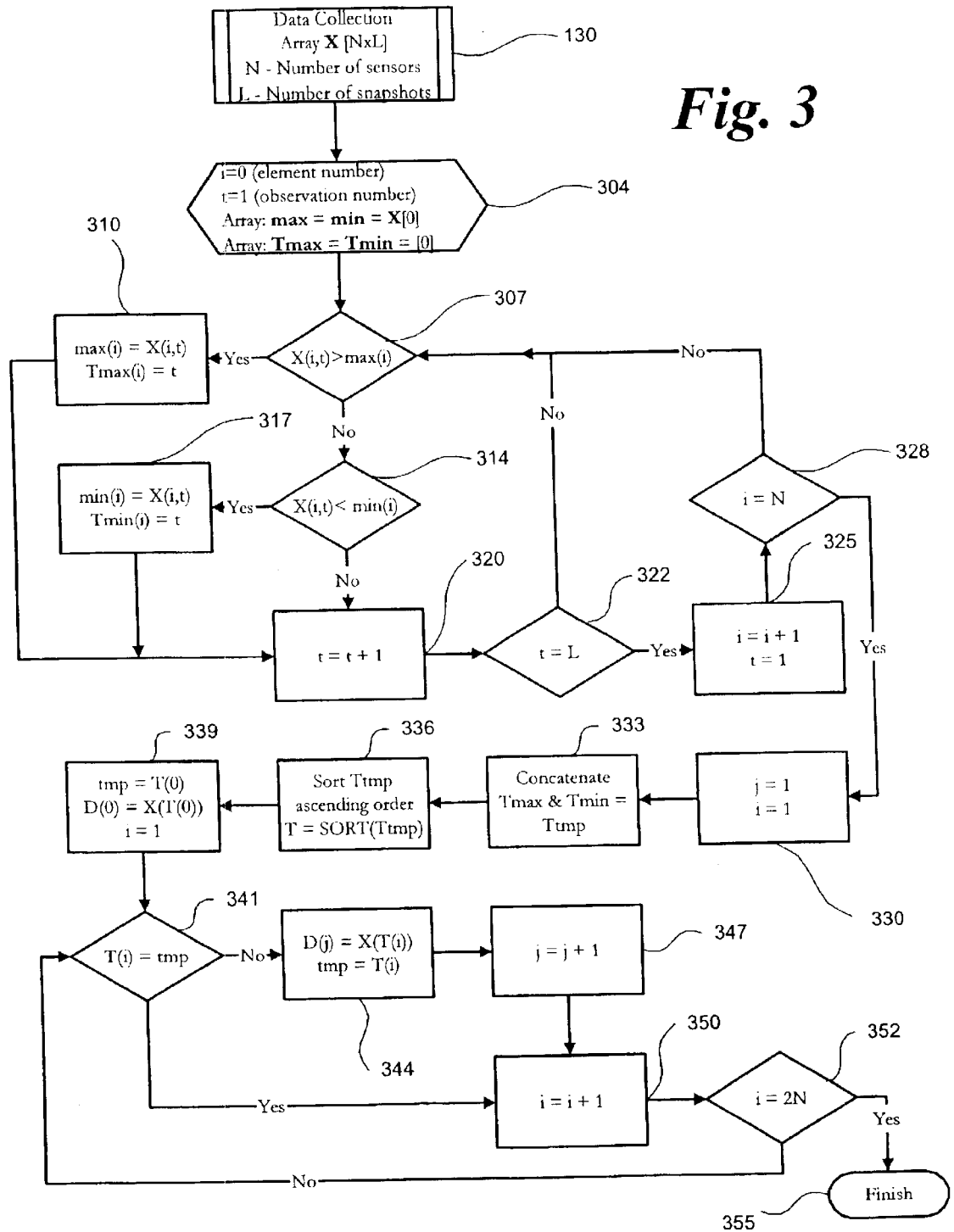
FIG. 3 illustrates a flowchart for creating a representative "training" data set from collected sensor data for use in the invention.

Selection of representative data is further depicted in FIG. 3. Data collected in step 130 has N sensors and L observations or snapshots or temporally related sets of sensor data that comprise an array X of N rows and L columns. In step 304, a counter i for element number is initialized to zero, and an observation or snapshot counter t is initialized to one. Two arrays "max" and "min" for containing maximum and minimum values respectively across the collected data for each sensor, are initialized to be vectors each of N elements which are set equal to the first column of X. Two additional arrays Tmax and Tmin for holding the observation number of the maximum and minimum value seen in the collected data for each sensor, are initialized to be vectors each of N elements, all zero.

In step 307, if the sensor value of sensor i at snapshot t in X is greater than the maximum yet seen for that sensor in the collected data, max(i) is update to equal the sensor value and Tmax(i) stores the number t of the observation in step 310. If not, a similar test is done for the minimum for that sensor in steps 314 and 317. The observation counter t is incremented in step 320. In step 322, if all the observations have been reviewed for a given sensor (t=L), then t is reset and i is incremented (to find the maximum and minimum for the next sensor) in step 325. If the last sensor has been finished (i=N), step 328, then redundancies are removed and an array D is created from a subset of vectors from X.

First, in step 330, counters i and j are initialized to one. In step 333, the arrays Tmax and Tmin are concatenated to form a single vector Ttmp having 2N elements. These elements are sorted into ascending (or descending) order in step 336 to form array T. In step 339, holder tmp is set to the first value in T (an observation number that contains a sensor minimum or maximum). The first column of D is set equal to the column of X corresponding to the observation number that is the first element of T. In the loop starting with decision step 341, the ith element of T is compared to the value of tmp that contains the previous element of T. If they are equal (the corresponding observation vector is a minimum or maximum for more than one sensor), it has already been included in D and need not be included again. Counter i is incremented in step 350. If they are not equal, D is updated to include the column from X that corresponds to the observation number of T(i) in step 344, and tmp is updated with the value at T(i). The counter j is then incremented in step 347. In step 352, if all the elements of T have been checked, then the distillation into training set D has finished, step 355.

Figure 4:
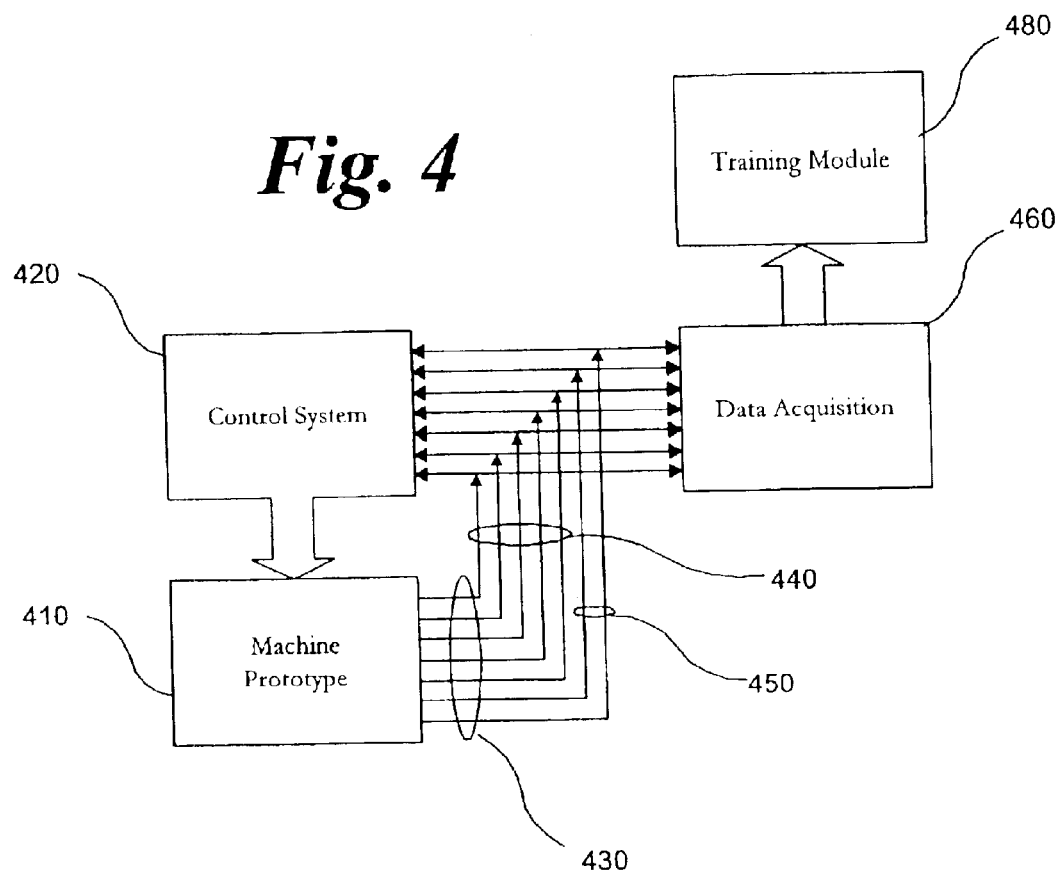
FIG. 4 is a diagram of an arrangement for obtaining a data set history for a machine, for use in the present invention.

Turning to FIG. 4, a schematic diagram of a laboratory workbench arrangement is shown for gathering process or machine behavior data for distillation. A machine prototype 410 is depicted, which may be any kind of machine for which virtual sensors are required or desirable. For example, machine 410 may be a combustion engine, an electric motor, a pump, a compressor, a refrigerator, and so on. The machine 410 is called a prototype, but importantly, it should generate sensor data that is substantially the same as the actual parameter values expected in a production model of the machine, as would be measured by the same sensors. Of course, the prototype may also be an instance of the production model itself, and ideally need not differ in any way from other production models. The machine 410 may be connected to and controlled by a control system 420, generally comprising a microcontroller-or microprocessor-based digital system with appropriate analog/digital and digital/analog inputs and outputs as necessary. Machine 410 is instrumented with sensors that provide sensor values along outputs 430. While all parameters of interest are instrumented in this laboratory workbench arrangement, it is understood that only a subset 440 of the sensors will be employed in a production model of; the machine 410, while a second subset 450 of sensors will not be employed or cannot be reliably employed in the production model of the machine 410. This may be done to avoid costs for sensors 450, or may be due to the difficulty or impossibility of employing sensors 450 for as long as needed in the production model. The machine 410 is operated through the expected range of operations, and data acquisition system 460 may be used to then record the values of all sensors 430 with which machine 410 is instrumented. Additionally, control signals from control system 420 may also be recorded by data acquisition system 460, and may be used as "sensor signals" that correlate with the other sensor signals.

Data acquired by data acquisition system 460 can accordingly be processed using a computer module 480 for producing a distilled training set of data representing the operational ranges of machine 410, using the training method described above, or other methods as may be known in the art.

Figure 5:
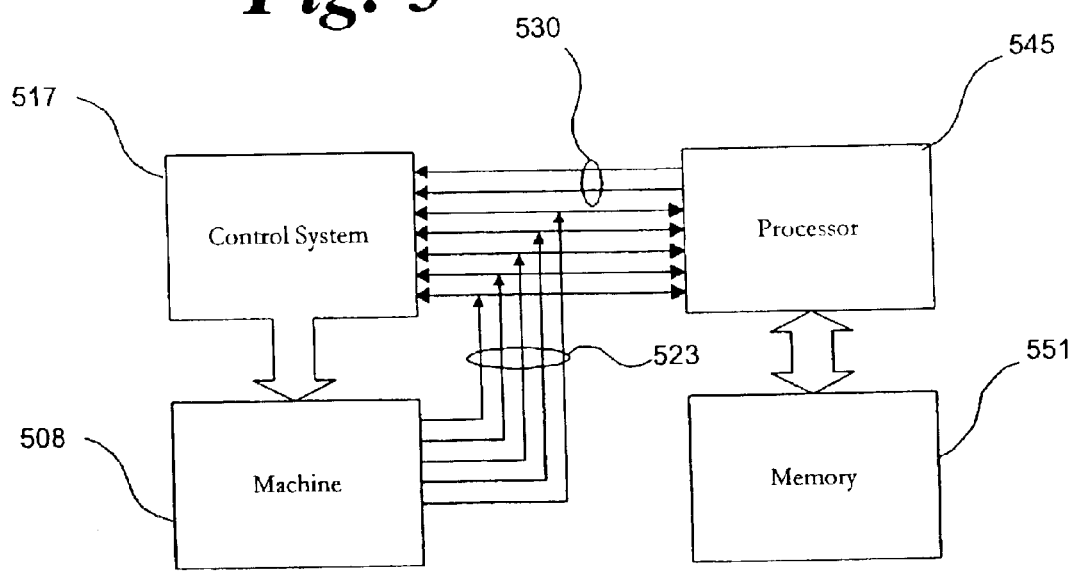
FIG. 5 illustrates an on-board processor embodiment of the present invention for generating virtual signals for a monitored or controlled machine or process.

In the presently described embodiment an on-board processor is shown in FIG. 5, wherein a machine (or process) 508 is controlled by a control system 517 that is located on the machine. Machine 508 is instrumented with sensors for some of the physical or logical parameters of interest in controlling the machine, and the outputs for these sensors are shown as output conductors 523, which feed into the control system 517. These are also feed to a processor 545 located within or on the machine, disposed to execute a computing program for generating a set 530 of at least one virtual signal from the signals on the output conductors 523. The processor is connected to a memory 551, also on or in the machine, which stores data comprising the training set distilled to represent the expected operational states of the machine 508. Memory 551 can also advantageously store programs for execution by the processor 545. The virtual signals 530 generated by the processor 545 are provided to the control system 517, in lieu of genuine sensor values for physical or logical parameters of the machine. In this way, using a processor and memory located on or within the machine, the control system for the machine can advantageously be provided with sufficient physical parameter values of the machine to effectively control it, even if some of the physical parameters have not been instrumented, due to cost savings considerations, or due to the impracticability of instrumenting one or more physical parameters.

Processor 545 can also be a part of the control system 517, and in fact can be the processor on which the control system routines are executed, in the event the control system is a digital computed control system. Ideally, the processor 545 and memory 551 are powered by the same power source as the control system. However, under certain circumstances, it may also be preferable to provide for a processor and memory independent from the processor and/or memory of the control system, in order to provide virtual signals 530 in a timely fashion, as though they were truly instrumented parameters. For example, it may be necessary that processor 545 must operate at a higher clock speed than any processor available within the control system, in order to provide virtual signals in a way that appears to the control system indistinguishable from a genuinely instrumented parameter. Also, processor 545 and memory 551 can comprise a separate unit from the control system with its own power supply that can be retrofitted to an existing machine and control system.

Figure 6:
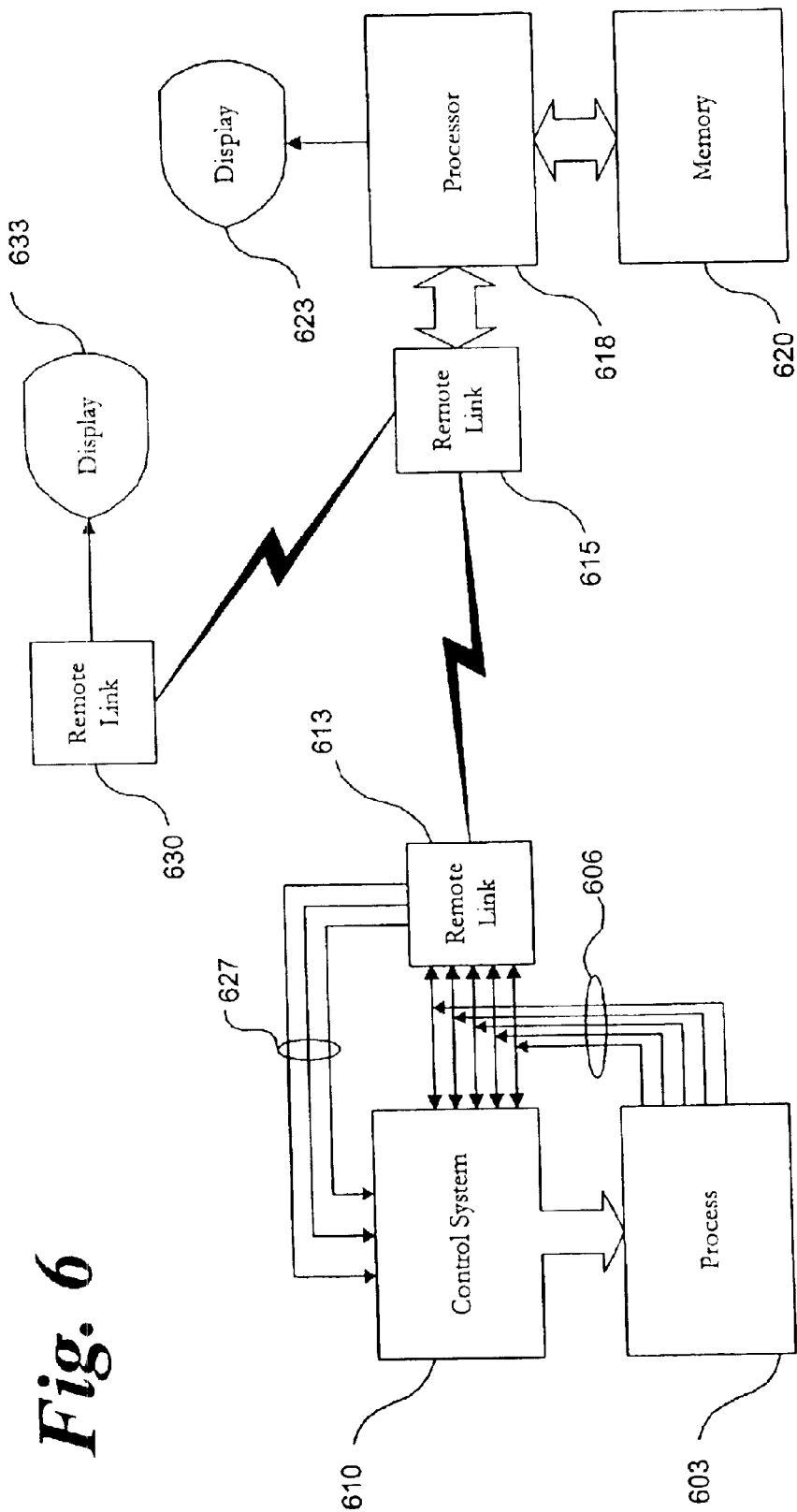
FIG. 6 illustrates a remote monitoring embodiment of the present invention for generating virtual signals for a monitored or controlled machine or process.

According to another embodiment, a process 603 is shown in FIG. 6 to be instrumented with sensors having output leads 606. These provide sensor signals to a control system 610 that controls the process. These signals are also provided to a remote communications link 613, which is disposed to communicate digital values of the sensor signals to a second remote communications link 615, located at a physically remote place. A processor 618 is provided, which may comprise a computing system and software, that uses the sensor signals received by link 615 to generate at least one virtual sensor signal indicative of an inferred physical parameter of process 603. A memory 620 is provided to store training set data representative of the expected operational behavior of the process 603, according to the distillation method described above. Furthermore, a display 623 may be provided at the remote location for displaying data descriptive of the process 603, comprising sensor signals 606 or the virtual signals derived therefrom or both. The virtual signals generated by processor 618 can also be transmitted from link 615 back to link 613 and input over leads 627 to control system 610 for advantageous control of the process. Data comprising original sensor signals and/or virtual sensor signals can also be transmitted to a third remote communications link 630, located at yet a third distant place, for display on display 633, thereby providing valuable information concerning the process to interested parties located at neither the physical plant of the process nor at the site of computing the virtual signals.

The remote communications links can be selected from a variety of techniques known in the art, including internet protocol based packet communication over the public telecommunications infrastructure, direct point-to-point leased-line communications, wireless or satellite. More specifically, remote links 613, 615 and 630 may be internet-enabled servers with application software for accumulating, queuing and transmitting data as messages, and queues for receiving and reconstituting data arriving as messages. Alternatively, communications can be synchronous (meaning in contrast to asynchronous, message-based communications) over a wireless link.

The embodiment of the invention shown in FIG. 6 provides computation of the virtual signals using computing resources that are located geographically distant from the process (or machine) being monitored and/or controlled with the virtual signals. One benefit of this is that the computing resources for generating the virtual signals may be shared for a multitude of processes or machines, where the memory 620 may hold multiple sets of training sets of data characterizing the various monitored processes and machines. Another benefit is that the virtual signal results may be displayed and also potentially used in further analysis by interested parties located distant from the process being monitored.

The calculations to be carried out by the information processor are described in detail below. Using as an example a machine that will be mass produced that has fifteen total physical parameters of interest, we assume ten of these will be instrumented with real sensors providing real signals during machine operation, and five signals will be inferred from the first ten, thereby reducing the cost to produce the machine by the cost of the sensors for these five parameters. In what follows, the subscript "in" generally corresponds to the ten real sensors whose values are input to the calculations, and the subscript "out" generally corresponds to the five inferred sensor values that are output by the calculation.

The step of providing a representative training set according to the description above results in a matrix D of values, having fifteen rows (corresponding to all fifteen parameters measured in the test or lab setting) and a sufficient number n of columns (sets of simultaneous or temporally related sensor readings) to properly represent the full expected dynamic operating range of the machine. The matrix D comprises two adjoined matrices, $D_{in}$ and $D_{out}$, each having n columns: $D_{in}$ has ten rows (corresponding to the ten real sensors) and $D_{out}$ has five rows, corresponding to the five inferred sensors. While the order of the columns does not matter in D, the ith column in both $D_{in}$ and $D_{out}$ must correspond.

Then, using $y_{in}$ to designate a vector having ten elements corresponding to the values of the ten real sensors (preferably in real-time), a vector $y_{out}$ is generated having five elements corresponding to the five inferred sensor values, according to:

$$\vec{y}_{out} = \bar{D}_{out} \cdot \vec{W}$$

where W is a weight vector having as many elements N as there are columns in D, generated by:

$$\vec{W} = \frac{\hat{W}}{\left(\sum_{j=1}^{N} \hat{W}(j)\right)}$$

$$\hat{\underline{W}} = \left(\bar{D}_{in}^T \otimes \bar{D}_{in}\right)^{-1} \cdot \left(\bar{D}_{in}^T \otimes \vec{y}_{in}\right)$$

where ⊗ represents a similarity operation between the two operands described in greater detail below that yields an array. The superscript "T" here represents the transpose of the matrix, and the superscript "−1" represents the inverse of the matrix or resulting array. Importantly, there must be row correspondence to same sensors for the rows in $D_{in}$ and $y_{in}$, and for $D_{out}$ and $y_{out}$. That is, if the first row of the representative training set matrix $D_{in}$ corresponds to values for a first sensor on the machine, the first element of $y_{in}$ must also be the current value (if operating in real-time) of that same first sensor.

Figure 7:
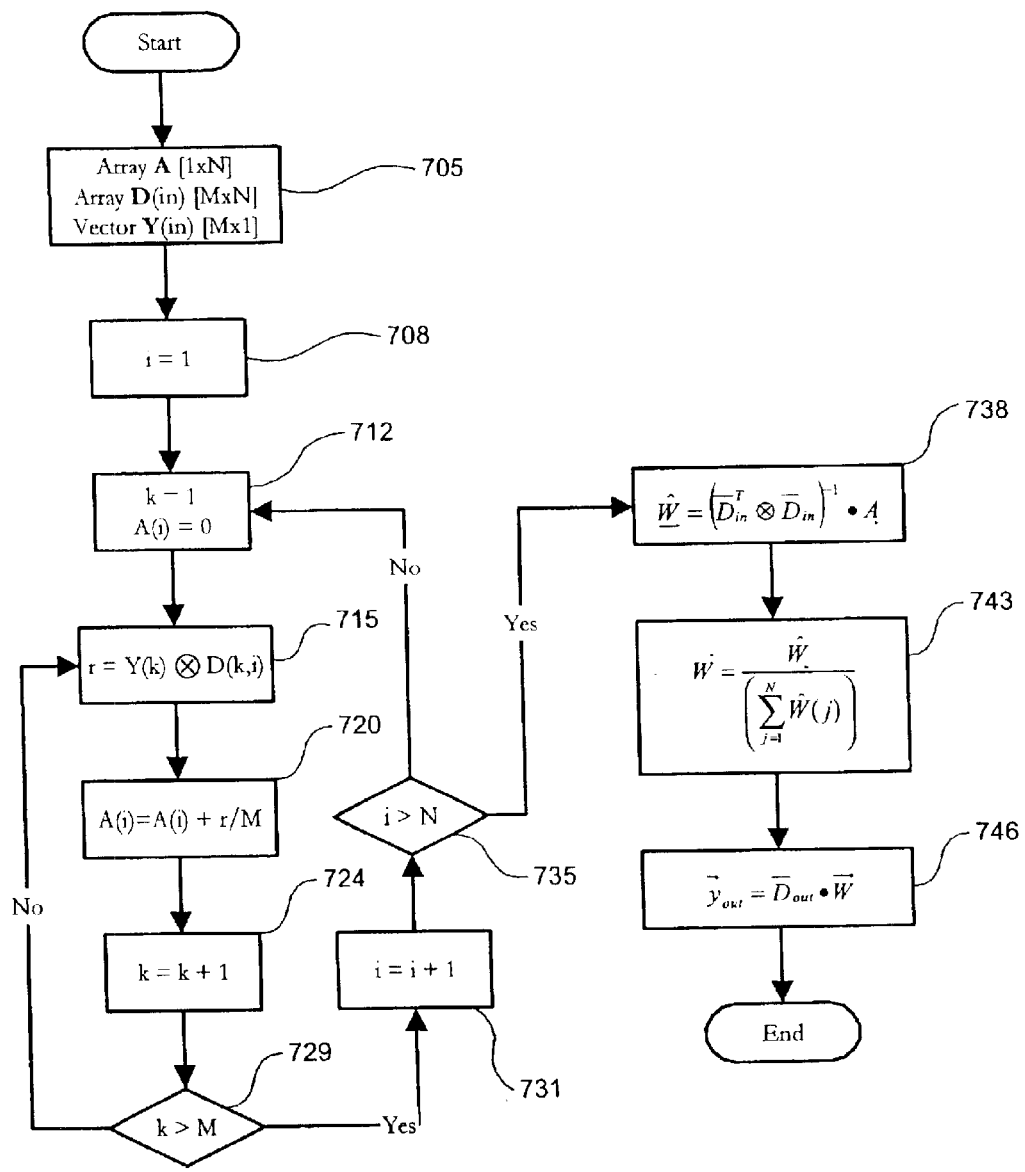
FIG. 7 illustrates a flowchart for generating a set of one or more virtual sensor signals according to the present invention.

Turning to FIG. 7, the generation of one or more replacement or inferred signals is shown in a flowchart. The flowchart shows the generation of one replacement or inferred signal in the described embodiments, provide input of one snapshot of actual sensors values in real-time operation. Matrix $D_{in}$ is provided in step 705, along with the input snapshot vector $y_{in}$ and an array A for computations. A counter i is initialized to one in step 708, and is used to count the number of observations in the training matrix $D_{in}$. In step 712, another counter k is initialized to one (used to count through the number of sensors in a snapshot and observation), and array A is initialized to contain zeroes for elements.

In step 715, the element-to-element similarity operation is performed between the kth element of $y_{in}$ and the (ith, kth) element in $D_{in}$. These elements are corresponding sensor values, one from actual input, and one from an observation in the training history $D_{in}$. The similarity operation returns a measure of similarity of the two values, usually a value between zero (no-similarity) and one (identical) which is assigned to the temporary variable r. In step 720, r divided by the number of sensors M is added to the ith value in the one-dimensional array A. Thus, the ith element in A holds the average similarity for the elemental similarities of $y_{in}$ to the ith observation in $D_{in}$. In step 724, counter k is incremented.

In step 729, if all the sensors in a particular observation in $D_{in}$ have been compared to corresponding elements of $y_{in}$, then k will now be greater than M, and i can be incremented in step 731. If not, then the next element in $y_{in}$ is compared for similarity to its corresponding element in $D_{in}$.

When all the elements of the current actual snapshot $y_{in}$ have been compared to all elements of an observation in $D_i$, a test is made in step 735 whether this is the last of the observations in $D_{in}$. If so, then counter i is now more than the number of observations N in $D_{in}$, and processing moves to step 738. Otherwise, it moves back to step 712, where the array A is reset to zeroes, and the element (sensor) counter k is reset to one. In step 738, a weight vector W-carrot is computed from the equation shown therein, where $\otimes$ represents a similarity operation, typically the same similarity operator as is used in step 715. In step 743 W-carrot is normalized using a sum of all the weight elements in W-carrot, which ameliorates the effects in subsequent steps of any particularly large elements in W-carrot, producing normalized weight vector W. In step 746, this is used to produce the replacement or inferential output $y_{out}$ using $D_{out}$. The output vector may have just one element, in the case that only one replacement or inferential signal is being generated, or it may have multiple elements, corresponding to each "virtual" sensor being generated. The matrix $D_{out}$ has been described above as containing counterpart training data for the sensor(s) being generated.

The similarity operation can be selected from a variety of known operators that produce a measure of the similarity or numerical closeness of rows of the first operand to columns of the second operand. The result of the operation is a matrix wherein the element of the ith row and jth column is determined from the ith row of the first operand and the jth column of the second operand. The resulting element (i,j) is a measure of the sameness of these two vectors. In the described embodiment, the ith row of the first operand generally has elements corresponding to sensor values for a given temporally related state of the machine, and the same is true for the jth column of the second operand. Effectively, the resulting array of similarity measurements represents the similarity of each state vector in one operand to each state vector in the other operand.

By way of example, one similarity operator that can be used compares the two vectors (the ith row and jth column) on an element-by-element basis. Only corresponding elements are compared, e.g., element (i,m) with element (j,m) but not element (i,m) with element (j,n). For each such comparison, the similarity is equal to the absolute value of the smaller of the two values divided by the larger of the two values. Hence, if the values are identical, the similarity is equal to one, and if the values are grossly unequal, the similarity approaches zero. When all the elemental similarities are computed, the overall similarity of the two vectors is equal to the average of the elemental similarities. A different statistical combination of the elemental similarities can also be used in place of averaging, e.g., median.

Figure 8:
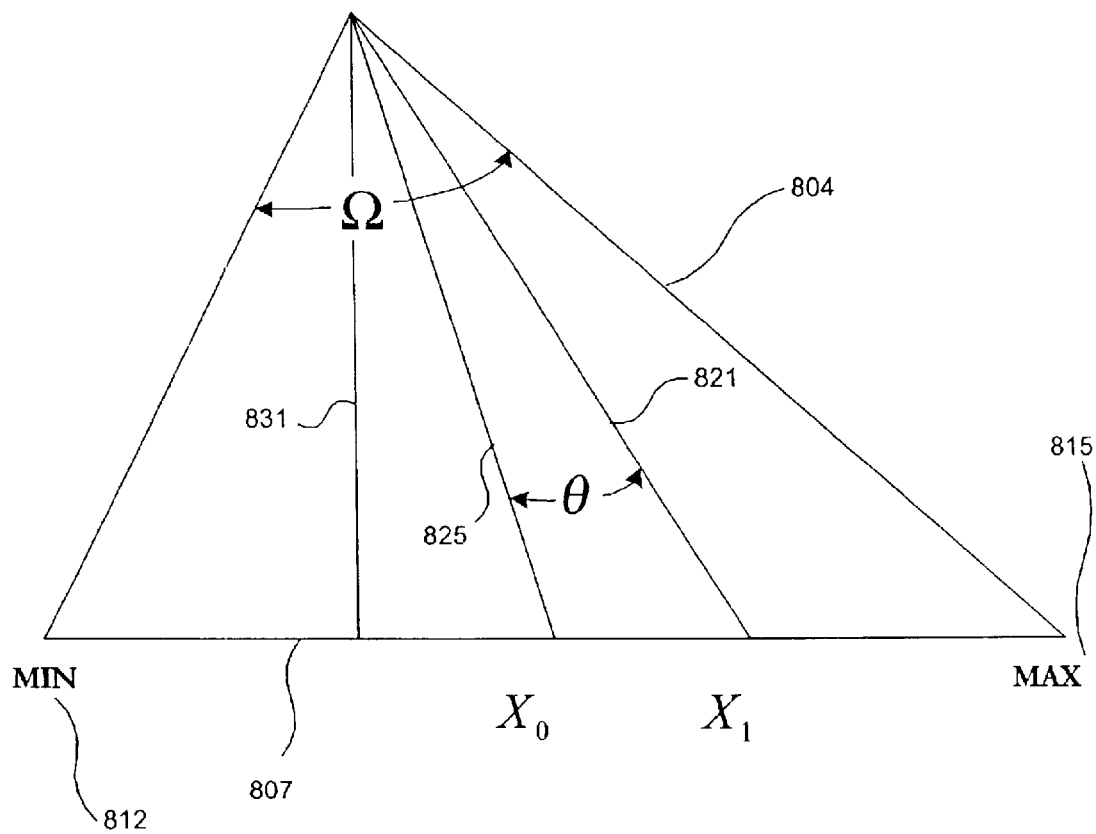
FIG. 8 illustrates the computation of one of the similarity operators of the present invention.

Another example of a similarity operator that can be used can be understood with reference to FIG. 8. With respect to this similarity operator, the teachings of U.S. Pat. No. 5,987,399 to Wegerich et al. are relevant, and are incorporated in their entirety by reference. For each sensor or physical parameter, a triangle 804 is formed to determine the similarity between two values for that sensor or parameter. The base 807 of the triangle is set to a length equal to the difference between the minimum value 812 observed for that sensor in the entire training set, and the maximum value 815 observed for that sensor across the entire training set. An angle $\Omega$ is formed above that base 807 to create the triangle 804. The similarity between any two elements in a vector-to-vector operation is then found by plotting the locations of the values of the two elements, depicted as $X_0$ and $X_1$ in the figure, along the base 807, using at one end the value of the minimum 812 and at the other end the value of the maximum 815 to scale the base 807. Line segments 821 and 825 drawn to the locations of $X_0$ and $X_1$ on the base 807 form an angle $\theta$. The ratio of angle $\theta$ to angle $\Omega$ gives a measure of the difference between $X_0$ and $X_1$ over the range of values in the training set for the sensor in question. Subtracting this ratio, or some algorithmically modified version of it, from the value of one yields a number between zero and one that is the measure of the similarity of $X_0$ and $X_1$.

Any angle size less than 180 degrees and any location for the angle above the base 807 can be selected for purposes of creating a similarity, but whatever is chosen must be used for all similarity measurements corresponding to particular sensor and physical parameter of the process or machine. Thus, differently shaped triangles 804 can be used for different sensors. One method of selecting the overall shape of the triangle is to empirically test what shape results in consistently most accurate virtual signal results.

For computational efficiency, angle $\Omega$ can be made a right angle (not depicted in the figure). Designating line segment 831 as a height h of the angle $\Omega$ above the base 807, then angle ($\theta$) for a given element-to-element similarity for element i is given by:

$$\theta_i = \tan^{-1}\left(\frac{h}{X_1(i)}\right) - \tan^{-1}\left(\frac{h}{X_0(i)}\right)$$

Then, the elemental similarity is:

$$s_i = 1 - \frac{\theta_i}{\pi/2}$$

As indicated above, the elemental similarities can be statistically averaged or otherwise statistically treated to generate an overall similarity of a snapshot to another snapshot, as if called for by the system.

Yet another class of similarity operator that can be used in the described embodiments involves describing the proximity of one state vector to another state vector in n-space, where n is the dimensionality of the state vector of the current snapshot of the monitored process or machine. If the proximity is comparatively close, the similarity of the two state vectors is high, whereas if the proximity is distant or large, the similarity diminishes, ultimately vanishingly. By way of example, Euclidean distance between two state vectors can be used to determine similarity. In a process instrumented with 20 sensors, for example, wherein a $21^{st}$ uninstrumented parameter is beneficially inferred, the Euclidean distance between the currently monitored snapshot, comprising a 20 element state vector, and each state vector in the training set (comprising a 20 element vector where the $21^{st}$ element corresponding to the virtual sensor has been left out) provides a measure of similarity, as shown:

$$S = \frac{1}{\left[1 + \frac{\|\vec{x} - \vec{d}\|^\lambda}{c}\right]}$$

wherein X is the current snapshot, and d is a state vector from the training set, and $\lambda$ and c are user-selectable constants.

Figure 9:
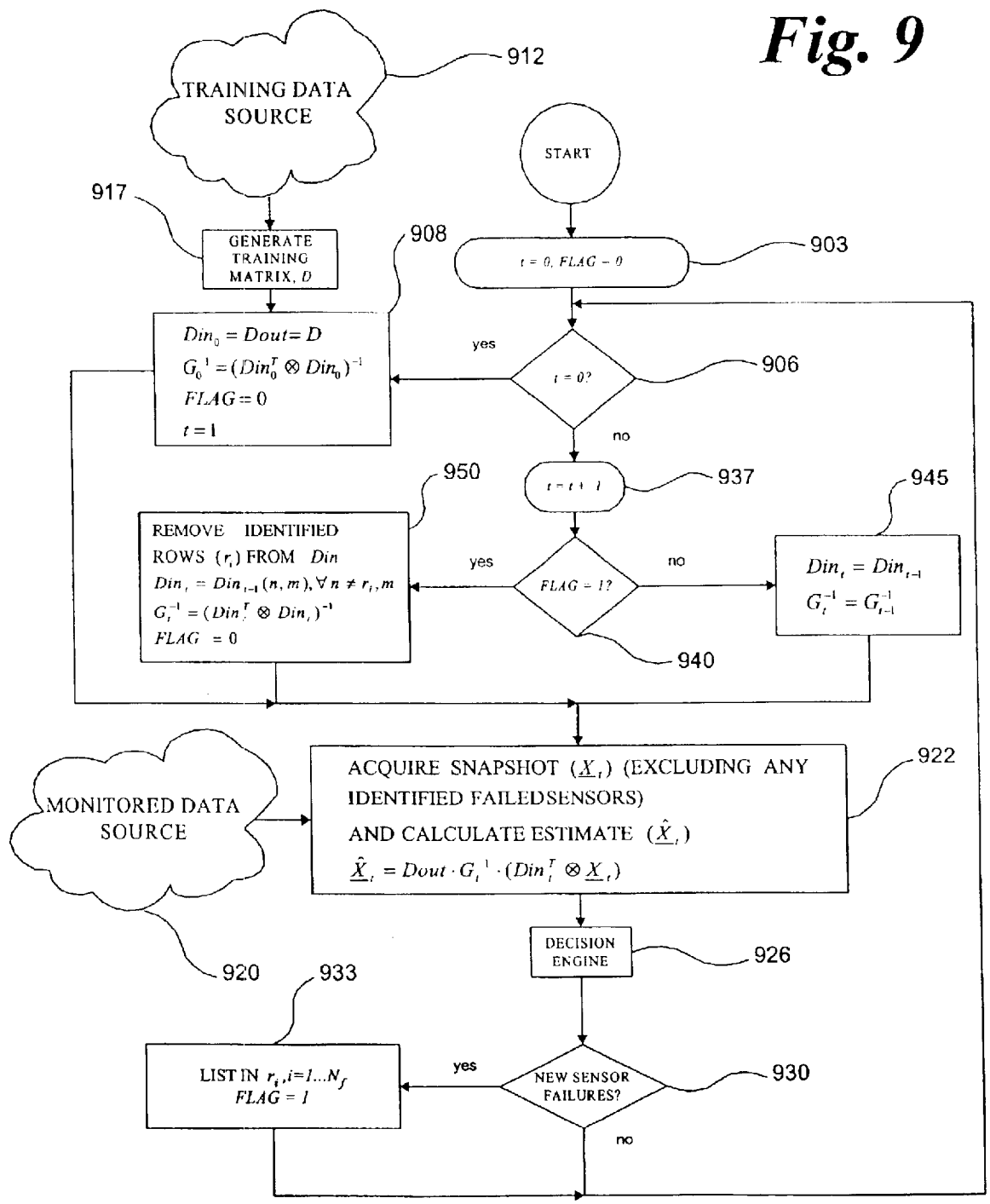
FIG. 9 illustrates a flowchart of decision logic for generating a replacement virtual signal in a monitored process or machine according to the invention.

Turning to FIG. 9, decision logic is depicted for a method of checking for failed sensors and generating replacement signals in response thereto according to the invention. Such a method can be embodied in a processor and memory as would be known in those skilled in the art, to provide a system for monitoring a machine or process in real-time and generating one or more replacement virtual signals as necessary in response to a detected failure of a sensor on the machine or process. In step 903, a FLAG variable is initialized to zero, and a snapshot counter t is also initialized to zero. On the first loop through the method, if t is zero in step 906, then initial training is carried out in step 908. A training set 912 distilled in the described embodiment provides a training matrix of snapshots 917. In step 908, the matrix $D_{in}$ and $D_{out}$ are set equal to matrix D of 917, the FLAG is set to zero, t is set to 1 and an intermediate matrix $G_0$ is found by:

$$G_0^{-1} = (D_{in_0}{}^T \otimes D_{in_0})^{-1}$$

using the similarity operation.

Real-time or on-line monitoring of the machine or process by acquisition of real sensor data 920 then proceeds in step 922, wherein a snapshot $X_t$ of time-correlated or coincident data is acquired from sensors on the machine or process.

The acquired data is used to compute estimated values for all the sensors according to:

$$\hat{X}_t = D_{out} \cdot G_t^{-1} \cdot (D_{in_t}{}^T \otimes X_t)$$

Such an estimate of all the sensors has utility as is known in the prior art, such as Gross et al. mentioned above, for comparing to the real sensor values and detecting when a process change is occurring. As can easily be discerned from this figure, if no sensors on the monitored machine or process have failed, then the matrices $D_{out}$ and $D_{in}(0)$ are equivalent.

A decision engine in step 926 examines whether any sensors have failed. Any of a variety of techniques known in the prior art for detecting sensor failure can be used, and can work by examining just the original monitored data or by comparing the monitored data to the estimated data. By way of example, one technique for determining whether a sensor has failed is to monitor whether the reading from the sensor has frozen at a single value over a sequence of readings over which it should have changed. As another example, sensor failure can be determined when a sensor reading suffers a sharp discontinuity or drops to zero, especially when the physical parameter being measured by the sensor cannot possibly be zero. In addition, certain "smart" sensors are available commercially that provide an indication that they have failed. In step 930, if one or more sensors have failed, they are flagged in step 933, and the FLAG variable is set to one. If no sensors have been determined as failed, then processing continues at step 906.

Returning to step 906, t is now not equal to zero, having been set to one in step 908. The counter t is incremented in step 937, corresponding to a reading of the next snapshot of data from genuine sensors. Upon checking the state of FLAG in step 940, if FLAG is still zero (no sensor has failed since the last loop through the process), then $D_{in}$ and G remain the same in step 945, and the next snapshot is acquired and processed continuing with step 922 again. If, on the other hand, FLAG has been set to one in step 933 as checked in step 940, then the arrays $D_{in}$ and G must be recalculated in step 950. Rows are removed from $D_{in}$, corresponding to the failed sensors (these are not removed from $D_{out}$). Array G is recalculated based on the new $D_{in}$. The FLAG is reset to zero. Then, in step 922, as the snapshot of the monitored process or machine is acquired, elements of the input vector X corresponding to the same failed sensors are removed. However, since $D_{out}$ has not had any rows removed, the estimate of X generated in step 922 includes estimates for the missing rows, that is, failed sensors. These estimates are thus the virtual sensor values computed as replacement values for the failed sensors.

Thus the embodiment advantageously provides the ability to generate replacement signals on-the-fly for failed sensors in monitoring systems employing a similarity operation for computing estimates for comparison to actual data. Such a replacement signal can be provided to downstream processing that requires a sensor signal from the failed sensor(s). Accordingly, a complex sensor signal can be decomposed into multiple correlated inputs to provide an inferential measure of an uninstrumented physical parameter of a system.

Figure 10:
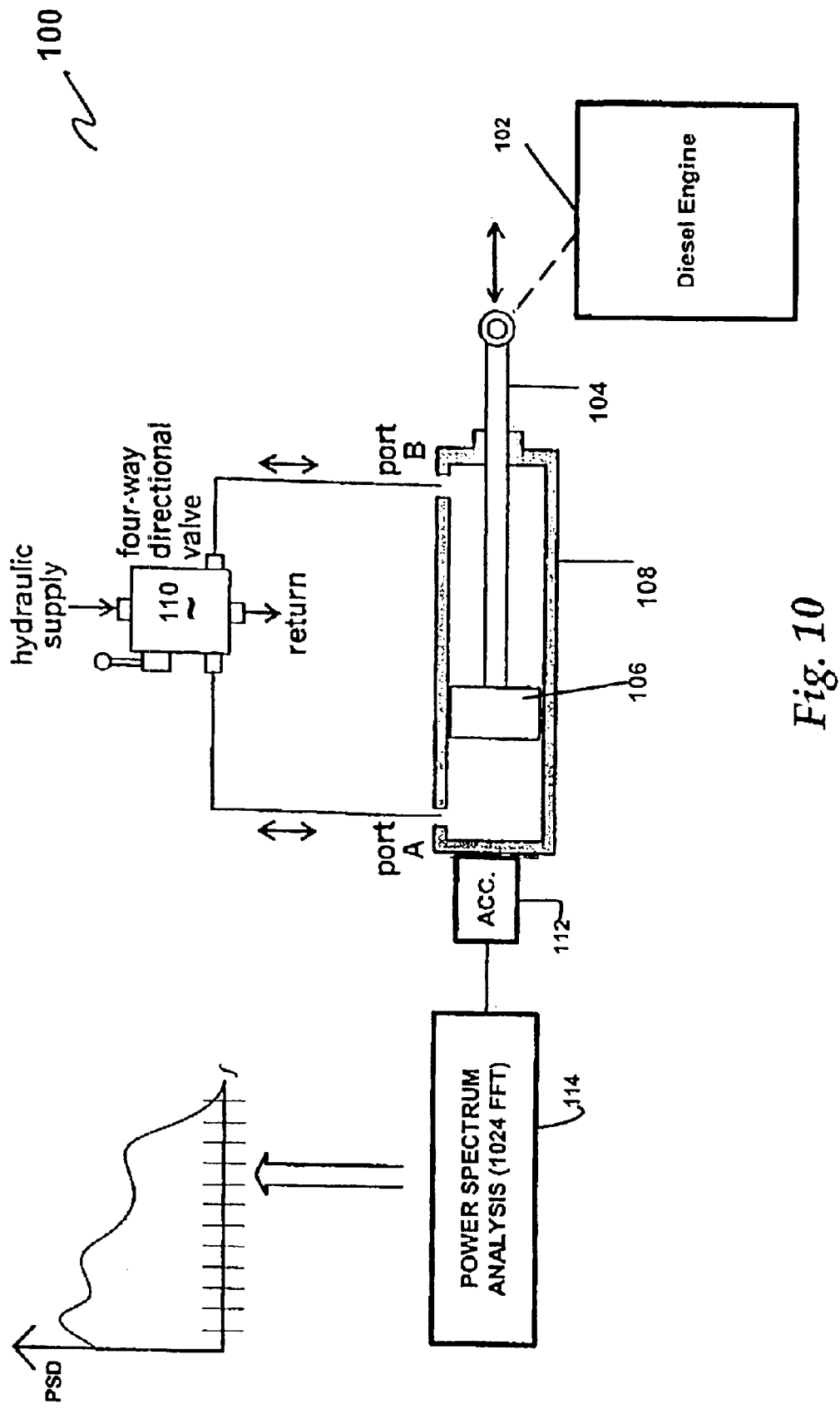
FIG. 10 illustrates a hydraulic system capable of being monitored by with the present invention using a complex signal.

Turning to FIG. 10, a hydraulic pump embodiment 100 is shown in which a diesel engine 102 drives a shaft 104 of the hydraulic system 100, which actuates a piston 106 in a cylinder 108 for controlling the hydraulic supply being provided by four-way directional valve 110. In the described embodiment, an eight-step cycle is provided for the hydraulic system to facilitate variable flow rates. The system 100 is outfitted with an accelerometer 112, preferably located so as to observe vibrations longitudinal with the variable displacements of the pump cylinders associated with the pistons 106 reciprocating therein. The introduction of contaminants in the hydraulic loop, such as particles and metallic grains or the like, wear on the valve and piston of the system, causing changes in the hydraulic pressure. This results in changes in vibrations from the pump, as it may compensate for the loss of pressure.

The parameter desirably estimated with a virtual signal in connection with the hydraulic system 100 can be the pressure or flow provided by the system. An invasive pressure transducer in the hydraulic line, however, can be obstructive and susceptible to failure. Accordingly, the accelerometer 112 is desirably used instead to facilitate virtual pressure readings correlated with the accelerometer 112. This is accomplished by outputting the complex signal from accelerometer 112 to a power spectrum analyzer 114, which can be embodied in a computer running a software module, with a data acquisition device attached to the accelerometer 112. The power spectral density (PSD) output by the analyzer 114 provides the power of the accelerometer-measured vibration as a function of the frequency of that vibration, using a 1024 sample fast Fourier transform (FFT) sliding window providing for frequency bins which may be user selectable, e.g., 30 frequency bins over the power spectrum being provided as an input observation vector for the similarity calculations as discussed above. Accordingly, the frequency components associated with the user selectable bins provide multiple input observations. The PSD can be used as a multi-variable input to the inferential signal generator. The uninstrumented physical parameter of hydraulic pressure, or flow as desired, is the inferred signal. The inputs from the PSD are the actual signals. These inputs can be selected from the following several alternatives.

In the first alternative, selected frequencies only can be used as inputs. For example, with some knowledge of the vibration frequencies likely to be of interest in the hydraulic system 100, several frequencies can be selected, and the value of the power at each of these frequencies can be used as a "sensor" input.

In another alternative, the frequencies can be "binned" or tallied across several bands of frequencies. In this case, the value (or "sensor" signal) for a given band or bin of frequencies can be one of the highest power value in the bin, the lowest power value in the bin, the average power value across the bin, or the median power value in the bin. Other variations clearly would also work, and are within the scope and spirit of the invention.

Thus, the described embodiments provide the benefit of working with decomposed complex signals as input to inferring an uninstrumented physical parameter. In an exemplary embodiment, data was collected from a standard window-mounted room air conditioner operating over a variety of expected conditions, in a large room serving as a thermal sink. The outputs from a total of 23 sensors were used and represented measurements of the temperature gradients across the evaporator and condenser. The data were acquired from k-type thermocouples that were digitized using a data acquisition board (DAQ) with a sampling rate setting of 100 samples/sec. The data were collected while the air conditioner maintained the room environment at a relatively constant temperature. The data was distilled to a training set according to the methods described herein. A large number of training snapshots (92, four times the number of sensor variables) relative to the number of sensors were employed to develop the empirical model of the air conditioner in operation.

To measure the fidelity of the empirical model, a total of 600 randomly chosen operating observations were estimated using the model developed from the training. For each such observation, a snapshot of the full 23 sensors was input to the model, which then generated an output of 23 estimates for those same sensors. A reference modeling estimation error was defined as the ratio of the average root-mean-square (RMS) of the residual (difference between the estimated and actual sensor value) to the standard deviation of the noise on the actual sensor value. When all 23 sensors were available as model input, the average estimation error was 0.271. This is a fraction of the average noise on the sensors.

The efficacy of accurately rendering virtual sensor signals is accessed by one after another sensor being randomly selected with valuea set to zero, simulating sensor failures. A maximum of 12 sensors was failed, corresponding to a loss of 52% of the originally available sensors. Estimation error as described above is shown in the following table for an increasing number of failed sensors as an average across all sensors. As would be expected, the estimation error increased as the number of failed sensors increased. However, it is notable that the estimation error across all the sensors remains comparatively low, indicating that the sensor estimates both for sensors that were not "failed" and even for sensors that were "failed" were usefully accurate.

| Number of Failed Sensors | Average RMS of Estimation Error |
| --- | --- |
| 0 | 0.2706 |
| 1 | 0.2763 |
| 2 | 0.2915 |
| 3 | 0.3096 |
| 4 | 0.3141 |
| 5 | 0.3237 |
| 6 | 0.3402 |
| 7 | 0.3523 |
| 8 | 0.3791 |
| 9 | 0.4014 |
| 10 | 0.4095 |
| 11 | 0.4348 |
| 12 | 0.4649 |

Turning to FIG. 11, a chart is shown of a virtual sensor signal generated for the air conditioner after failing the original sensor and two others, and excluding them as inputs to the empirical model. Also shown is the actual value of the original sensor. The abscissa of the chart is time in minutes. The ordinate is the value of the sensor, a temperature. As can be seen, when the sensor is treated as failed (as well as two others in the set of 23), and not provided to the empirical model, the model nonetheless generates a viable and useable estimate of the sensor value, based on the other values provided as input.

It will be appreciated by those skilled in the art that modifications to the foregoing preferred embodiments may be made in various aspects. The present invention is set forth with particularity in the appended claims. It is deemed that the spirit and scope of that invention encompasses such modifications and alterations to the preferred embodiment as would be apparent to one of ordinary skill in the art and familiar with the teachings of the present application.

What is claimed is:

1. A system for monitoring instrumented equipment, comprising:

a plurality of sensors capable of being monitored from the instrumented equipment;

an information processor;

a data acquisition input to said information processor for receiving operational values descriptive of physical parameters of the system from said plurality of sensors;

a memory operable for being coupled with said data acquisition input for storing a set of time-correlated sensor data representative of expected operational states, and signals observed during operation of the instrumented equipment;

said information processor generating at least one output value descriptive of a parameter of the instrumented equipment in addition to signals observed from said plurality of sensors on the instrumented equipment; and wherein said information processor uses a similarity operator to obtain a similarity measure between the expected operational states and the observed signals from the instrumented equipment.

2. A system as recited in claim 1, wherein said information processor determines a data acquisition failure associated with said data acquisition input from at least one of said plurality of sensors and provides an estimated replacement signal there for.

3. A system according to claim 2, wherein said memory stores a first model matrix derived from said set of time-correlated sensor data representative of expected operation states, and when said information processor determines a data acquisition failure has occurred with respect to at least one of said plurality of sensors, said information processor is disposed to generate a second model matrix derived from said set of time-correlated sensor data exclusive of any sensor associated with said data acquisition failure.

4. A system according to claim 3, wherein said first model matrix comprises similarity values from all pairwise comparisons of snapshots of all sets of time-correlated sensor data, and said second model matrix comprises similarity values from all pairwise comparisons of snapshots of sets of time-correlated sensor data excluding those sensors associated with said data acquisition failure.

5. A system as recited in claim 1, wherein said information processor uses a similarity operator with data in said memory comprising a plurality of snapshots of the operational states descriptive of the physical parameters of the system from said plurality of sensors, each snapshot comprising time-correlated data from said plurality of sensors.

6. A system as recited in claim 5, wherein said information processor measures similarity as a numerical closeness of the observed signals with expected operational states.

7. A system as recited in claim 6, wherein the numerical closeness of a set of observed signals to an expected operation state is determined by said information processor by averaging over all the observed signals an elemental similarity for each observed signal with a corresponding value in a snapshot for the expected operational state, and wherein each said elemental similarity is normalized by the expected range for each respective observed signal.

* * * * *